United States Patent [19]

Briggs et al.

[11] Patent Number: 4,705,708
[45] Date of Patent: Nov. 10, 1987

[54] MULTI-LAMINATE STRUCTURE CONTAINING A SCRAP LAYER AND CONTAINERS MADE THEREFROM

[75] Inventors: Jerald E. Briggs, St. Charles, Ill.; Henry Pfutzenreuter, Alta Loma, Calif.

[73] Assignee: American Can Company, Greenwich, Conn.

[21] Appl. No.: 579,291

[22] Filed: Feb. 15, 1984

Related U.S. Application Data

[63] This Application is a continuation of Ser. No. 354,636, filed Mar. 4, 1982, now abandoned.

[51] Int. Cl.[4] .............................................. B27N 5/02
[52] U.S. Cl. ..................................... 428/35; 426/127; 428/349; 428/516; 428/518; 428/522; 264/515; 264/DIG. 69
[58] Field of Search ............... 428/520, 516, 522, 500, 428/523; 426/127; 264/DIG. 69; 427/349, 354, 35, 518, 527, 515

[56] References Cited

U.S. PATENT DOCUMENTS

| | | | |
|---|---|---|---|
| 3,882,259 | 5/1975 | Nohara et al. | 420/516 |
| 3,940,001 | 2/1976 | Haefner et al. | 428/2 |
| 4,234,663 | 11/1980 | Catté et al. | 428/517 |
| 4,239,826 | 12/1980 | Knott, II et al. | 428/516 |
| 4,254,169 | 3/1981 | Schroeder | 428/516 |
| 4,287,147 | 9/1981 | Hungerford | 264/DIG. 69 |
| 4,289,830 | 9/1981 | Knott, II | 428/516 |

Primary Examiner—Edith Buffalow
Attorney, Agent, or Firm—Paul R. Audet

[57] ABSTRACT

A multi-layer laminate structure comprises a separate layer of scrap produced from the several thermoplastic resins used in making the laminate structure. In a preferred construction, the multi-layer laminate structure comprises an outer thermoplastic polyolefin layer, an inner thermoplastic polyolefin layer and an intermediate oxygen barrier layer preferably made of ethylene-vinyl alcohol copolymer. An adhesive layer bonds the barrier layer to the inner polyolefin layer and a separate scrap layer is disposed interiorly of the outer polyolefin layer. A second adhesive layer bonds the scrap layer to the intermediate barrier layer. Containers having excellent oxygen barrier properties and good transparency are made by forming a parison from the multi-layer laminate structure and blow molding the parison to the desired container shape.

23 Claims, 3 Drawing Figures

MULTI-LAMINATE STRUCTURE CONTAINING A SCRAP LAYER AND CONTAINERS MADE THEREFROM

This application is a continuation of Ser. No. 354,636 filed Mar. 4, 1982, now abandoned.

FIELD OF INVENTION

This invention generally relates to multi-layered laminated structure, process of making the same and containers made therefrom. It is particularly related to such laminated structure which comprises an oxygen impermeable barrier layer and at least one scrap layer produced from the extrudate of the multi-layered laminate structure, to a process of making such scrap layer-containing laminated structure and containers made therefrom.

BACKGROUND OF INVENTION

Multi-layered laminate structures have long been used to make containers for a variety of products wherein, due to industrial requirements and specifications, it is not possible to use containers made from a single layer plastic material. In packaging foods, liquids such as various juices, sanitary articles and a host of other products, the container wall must withstand attack by oxygen or some of the ingredients of the packaged product which often tend to permeate through the container wall.

It has, by now, become well known to make multi-layered laminate structures from thermoformable plastics and to make containers therefrom by injection molding or blow molding techniques, and numerous thermoplastic resins have been disclosed and recommended for this purpose. Some of these thermoplastic materials and the composite laminated structures made therefrom are described in U.S. Pat. Nos. 3,560,325; 3,595,740; 3,882,259; 3,955,697; 4,182,457 and 4,234,663, to cite a few.

As mentioned in U.S. Pat. No. 4,234,663 which issued to Catteé et al. on Nov. 18, 1980, when multi-layer foil structures are used to make containers by thermoforming of the foil, considerable amount of "scrap" is obtained which may be as high as 50% of the total weight of the initially coextruded materials. If the scrap cannot be included in the multi-layered laminate structure, it constitutes a waste which must be disposed of with consequent economic disadvantages.

In their aforementioned patent, Catteé et al. disclose re-introduction of at least part of the scrap into the multi-layer foil structure as a "supplementary" layer. The scrap-containing layer of Catteé et al., however, is constituted by a mixture of the scrap with sufficient amount of adhesive, which is, a graft copolymer of a styrenic monomer on a polyolefinic substrate.

In an article by Muneki Yamada entitled "Oriented Multi-Layer Containers for Food: Solid Phase Pressure Formed Cups and Stretch-Blow Molded Bottles", presented on Mar. 17–19, 1981 at the "5th Annual International Conference On Oriented Plastic Containers", the author discusses the technology of solid phase pressure forming and stretch-blow molding in the manufacture of multi-layer containers. With reference to FIGS. 2 and 3, the author describes a 7-layer structure which comprises a scrap layer interposed between a polypropylene layer and an adhesive layer with no significant reduction in clarity (transparency of the containers) provided the thickness of the scrap layer is within certain critical thickness ratio to the other layers.

At page 5, the Yamada article refers to U.S. Pat. No. 4,182,457 for making "oriented" containers. This patent, however, is basically concerned with making transparent containers obtained by orienting the thermoplastic polyolefin olefin layer during stretch below molding of the parison.

So far as it is known, there is not, at the present, a totally satisfactory method of utilizing all the scrap in making a satisfactory multi-layer laminate for forming containers.

It is, accordingly, an object of the present invention to provide a multi-layer laminate structure including a distinct and separate layer of scrap produced from the co-extrudate formed during coextrusion of the different layers of several thermoplastic materials.

It is a further object of this invention to provide a method for efficient and economical utilization of the scrap when making containers from multi-layer laminate structure comprising several thermoplastic materials.

It is also an object of the present invention to make packaging containers from multi-layer laminated structures which include a scrap layer, wherein the container has, inter alia, excellent oxygen permeability and transparency.

SUMMARY OF THE INVENTION

A multi-layer laminate structure is provided which includes a separate layer of scrap made from regrind of the extrudate of the various resins used in making the laminate structure. Preferably, the multi-layer laminate structure comprises an outer thermoplastic polyolefin layer, an inner thermoplastic polyolefin layer and an intermediate oxygen barrier layer. The outer and inner polyolefin layers are preferably made of polypropylene, particularly crystalline isotactic polypropylene, and the intermediate barrier layer is preferably made of ethylene-vinyl alcohol copolymer. A first adhesive layer bonds the inner polyolefin layer to the intermediate barrier layer. A separate scrap layer may be disposed interiorly of the outer polyolefin layer and a second adhesive layer bonds this scrap layer to the intermediate barrier layer. Alternatively, the separate scrap layer may be interposed between the inner polyolefin layer and the second adhesive layer, or it may be interposed at both of said positions.

Both adhesive layers are preferably made of maleic anhydride modified polypropylene to provide interlaminar strength and the several layers are formed by co-extrusion.

In order to make a container, the multi-layer structure is coextruded into a parison tube which is then placed in a blow mold and inflated by injection of air, under pressure, to form the container. Notwithstanding the inclusion of a separate scrap layer in the multi-layer structure, containers made therefrom exhibit excellent structural integrity, impermeability to oxygen and moisture and transparency.

The scrap is produced from regrind of the extrudate of the several thermoplastic layers and is reintroduced into the laminate structure by proper coextrusion sequence.

BRIEF DESCRIPTION OF THE DRAWING

In the drawings, wherein like reference numerals designate like parts.

DETAILED DESCRIPTION OF THE INVENTION

Figure 1:
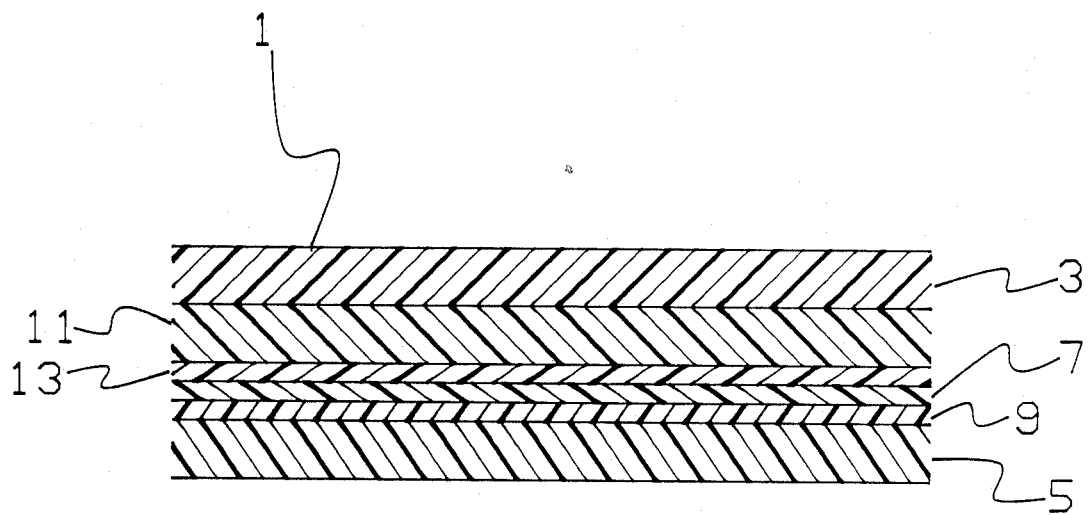
FIG. 1 is a schematic sectional view illustrating the arrangements of the various layers of a 6-layer laminate structure, including a separate scrap layer, made in accordance with a preferred embodiment of this invention.

According to the broad principles of this invention, the several layers are first coextruded to form a parison tube which is then molded and shaped into the desired container form. It must be mentioned, however, that the formation of the parison tube and the container are well known techniques in the plastic industry. For example, one such method is described in U.S. Pat. No. 4,079,850 wherein a multi-layer resin in the molten state is coextruded to form a parison. A pair of split molds are disposed around the parison and the split molds have such a configuration that when they are in register with each other, they define a cavity which correspond to the shape of the desired container. By injecting air, under pressure, the parison is blow molded to form the container. A further disclosure of the apparatus for making the containers is disclosed in our copending application Ser. No. 445,261, filed Nov. 29, 1982, now U.S. Pat. No. 4,522,775, issued June 11, 1985, which is continuation-in-part of our parent application Ser. No. 354,636, now abandoned.

In the preferred practice of this invention as illustrated in the drawing, the laminate structure has an intermediate gas and oxygen barrier layer of ethylene-vinyl alcohol copolymer, outer and inner structural layers of a thermoplastic polyolefin, a separate scrap layer adjacent to the outer polyolefin layer and two adhesive layers, one interposed between the intermediate barrier layer and the scrap layer, and the other is interposed between the intermediate barrier layer and the inner polyolefin layer.

The polyolefins which are suitable in forming the outer and inner layers of the laminate structure are thermoplastic olefinic polymers such as e.g., low density polyethylene and polypropylene. Preferably, the polyolefin is a propylene-ethylene random copolymer containing about 2 mol percent ethylene.

The intermediate barrier layer is preferably ethylene-vinyl alcohol copolymer obtained by saponification of ethylene-vinyl acetate copolymers containing from about 15 to about 45 mol percent ethylene and from about 55 to about 85 mol percent vinyl acetate. The degree of saponification of the ethylene-vinyl acetate is usually at least about 96 percent and often ranges from about 98.5 to about 99.5 percent, the remainder being residual vinyl acetate. Other oxygen barrier materials may be used such as, for example, nylon, polyester polymers and copolymers and suitable blends thereof with ethylene-vinyl alcohol copolymers.

The saponfied (hydrolyzed) copolymer has a melt index measured by ASTMD1238-Test E, in the range of about 0.5 to about 2 and is an excellent barrier against oxygen permeation.

Both adhesive layers are preferably made of maleic anhydride modified polypropylene wherein the polypropylene backbone is modified with maleic anhydride moieties. One such adhesive is available from Mitsui, Japan, under the Trademark ADMER QB 530. In general, however, polypropylene modified with ethylenically unsaturated carboxylic anhydrides may be used as the adhesive layers for the present laminate structure.

It must be mentioned that the aforementioned adhesives are particularly well suited when polypropylene or propylene-ethylene random copolymers constitute the outer and inner structural layers. However, when this layer is made of polyethylene, it is preferable to use a different adhesive such as, for example, the Plexar adhesives manufactured by Chemplex Company, Rolling Meadows, Ill. These adhesives are a blend of ethylene-vinyl acetate copolymer and a graft copolymer of polyethylene and a dicarboxylic acid anhydride The scrap layer is made of regrind of the coextrudates of the different thermoplastic layers used to form the parison tube. The nature of the scrap and its incorporation into the laminate structure will hereinafter be described in detail in connection with the description of the process of this invention.

Referring now to the drawing, the multi-layer laminate structure generally designated as 1 has an outer polyolefin structural layer 3, an inner polyolefin structural layer 5 and an intermediate oxygen barrier layer 7. The inner polyolefin layer 5 is adhesively bonded to the intermediate barrier layer 7 by the adhesive layer 9.

As is further shown in the drawing the laminate structure 1 includes a separate scrap layer 11 which is adhesively bonded to the intermediate layer 7 by a second adhesive layer 13.

All the layers are coextensively bonded along their respective junctions with no interlaminar separation between the respective layers of the laminate structure.

In order to form the laminate structure, the thermoplastic resins used to make the different layers are coextruded, in the molten state through several dies, to form the parison tube. The parison tube is then blow molded by injection of air, under pressure, and is shaped into a container in a separate container mold. The excess materials from this blow molding operation are ground-up and mixed as a homogeneous scrap and the scrap layer is reintroduced into the laminate structure. As a practical matter, therefore, this process permits utilization of all the scrap produced during the container forming operations. Accordingly, the economy of this operation is considerably improved and waste disposal is virtually eliminated.

In addition to improving the economy of operation and reduction of waste disposal, it has been found that inclusion of a separate scrap layer in the multilayer laminate structure does not detract from the transparency of unoriented containers made of such laminate structures. The ability to make transparent containers by nonoriented blow molding of a multilayer laminate structure having a completely separate layer of scrap constitutes a novel and surprising feature of the present invention.

In forming the composite laminate described herein, it is preferable to first combine the adhesive layers with the barrier layer of ethylene-vinyl alcohol copolymer. The reason is that the barrier layer and the adhesive layers are relatively thin layers and their precombination therefore affords structural integrity to the combined layers and permit their uniform introduction into, and their extrusion through the die.

While the invention has heretofore been described with a certain degree of particularity and illustrated by a 6-layer laminate structure, several changes and modifications are suggested from the foregoing disclosure which arew nevertheless within the scope and contemplation of this invention. For example, additional layers may be used for decorative purposes or otherwise and more than one scrap layer can be reintroduced into the laminate structure if desired.

It is also within the contemplation of this invention to make a 5-layer laminate structure, and to form containers therefrom as aforesaid. In this construction, the scrap layer constitutes the outer layer and the outer polyolefin layer is therefore eliminated.

Additionally, if desired, the scrap layer may be interposed between the inner polyolefin layer and the second adhesive layer, or two scrap layers may be incorporated in the laminate structure; one interposed between the outer polyolefin layer and the first adhesive layer, and the other is interposed between the inner polyolefin layer and the second adhesive layer.

Containers having excellent oxygen barrier properties and good transparency can be made by varying the relative thicknesses of the different layers. For example, excellent barrier properties and good transparency can be obtained from the multi-layer structure of this invention when the thickness of the ethylene-vinyl alcohol layer is between about 0.5 to about 2 mils and the scrap layer constitutes up to about 40 weight percent of the total extrudate.

Figure 2:
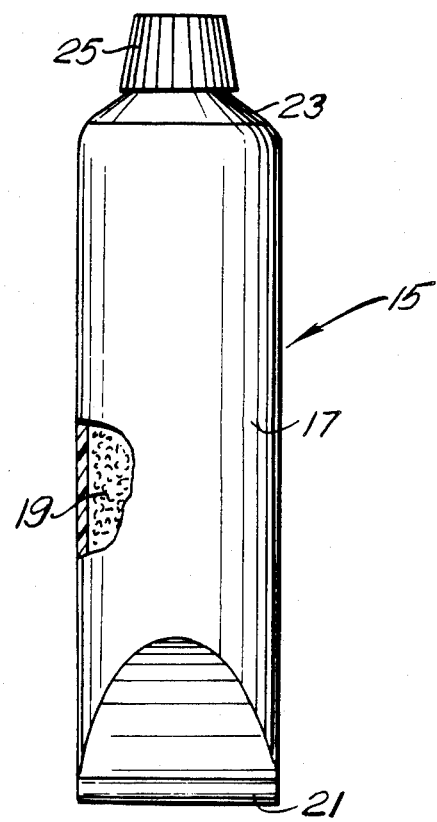
FIG. 2 is a side elevational view of a typical collapsible dispensing container, with portions of the body wall broken away.

FIG. 2 shows a collapsible container generally designated as 15 having a tubular body 17 which, after filling with the product 19, is closed at its end 21 by heat sealing or some other suitable technique. Mounted at the opposite end of the tubular body 17 is a plastic headpiece 23 which is usually shaped to provide an externally threaded neck for threaded engagement with an internally threaded cap 25. The headpiece 23 may be fused to the tubular body 17 by a suitable procedure such as described in U.S. Pat. No. 2,673,374.

Figure 3:
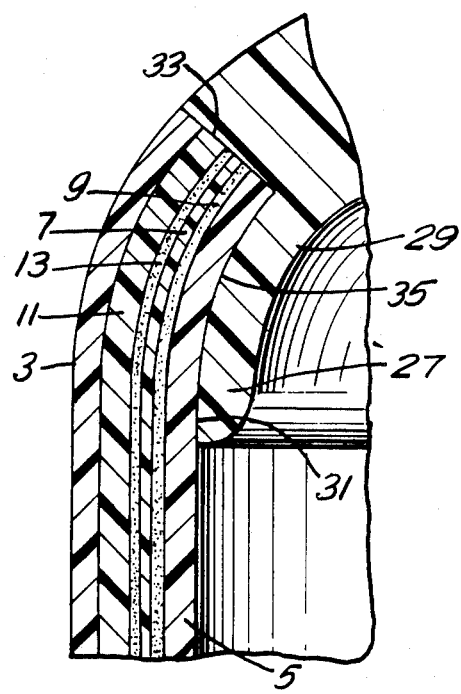
FIG. 3 is an enlarged partial sectional view showing the joint between the container body and its headpiece and illustrating the several layers of the laminate structure.

In FIG. 3, the tubular body 17 is shown to consist of six layers, laminated or otherwise bonded one to the other. The number of layers may vary, however, if desired. The layers shown in FIG. 3 are, from the outside to the inside of the tubular body:

outer layer 3 of a polyolefin
scrap layer 11
adhesive layer 13
oxygen barrier layer 7
adhesive layer 9
inner polyolefin layer 5

The nature and function of the different layers were previously discussed in connection with the description of the laminate structure shown in FIG. 1.

In bonding the headpiece 23 to the tubular body 17, headpiece 23 is provided with a cylindrical skirt portion 27 and a peripheral inwardly curved portion 29 which are bonded to the tubular body 17 and its upper marginal inner surface 31 and upper edge 33 to form a head Joint 35. The continuous peripheral and vertical fused areas of the Joint 35 result in a strong attachment of the headpiece 23 to the tubular body 17 with a high resistance to separation by either axial, radial or twisting forces, or combinations thereof. Preferably, the upper end 37 is turned in slightly and recessed into the headpiece 23 with the edge 33 of the body welded to the material of the head so that the outer surface of the Joint 35 is a smooth substantially uninterrupted surface.

What is claimed is:

1. A multi-layer plastic container adapted to contain oxygen sensitive products or contain products sensitive to permeation losses, formed by coextruding in a molten state a plurality of plastic layers to form a parison, forming said parison into a container by blow-molding, said container having a plurality of layers formed from said parison comprising an inner thermoplastic polyolefin layer which is next to the product; an outer thermoplastic polyolefin layer; a barrier layer to prevent product oxidation or product permeation loss; a scrap layer including a mixture of a regrind of all the layers from previous containers of the same construction, said previous containers comprising inner and outer thermoplastic polyolefin layers, a barrier layer, an adhesive layer and a scrap layer; and at least one adhesive layer to adhere said barrier layer to a least one of the other layers.

2. A process of making a multi-layer plastic container which comprises coextruding in the molten state a plurality of plastic layers to form a parison, forming said parison into a container by blow-molding, said container having a plurality of layers formed from said parison comprising an inner thermoplastic polyolefin layer which is next to the product; an outer polyolefin thermoplastic layer; a barrier layer to prevent product oxidation or product permeation loss; a scrap layer including a mixture of a regrind of all the layers from previous containers of the same construction, said previous containers comprising inner and outer thermoplastic polyolefin layers, a barrier layer, an adhesive layer and a scrap layer; and at least one adhesive layer to adhere said barrier layer to at least one of the other layers.

3. A multi-layer plastic container adapted to contain oxygen sensitive products or contain products sensitive to permeation losses, said container being formed by internal blow-molding of a multi-layer tubular parison, said tubular parison having a plurality of layers coextruded in the molten state through a plurality of dies to form a parison with layers which are thereafter expanded by internal blow-molding said tubular parison into a mold having the shape of the container, said plurality of layers of said container including an inner thermoplastic polyolefin layer which is next to the product, an outer thermoplastic polyolefin layer; a barrier layer to prevent product oxidation or product permeation loss; a scrap layer including a mixture of regrind of all the layers from previous containers of the same construction, said previous containers comprising inner and outer thermoplastic polyolefin layers, a barrier layer, an adhesive layer and a scrap layer; and at least one adhesive layer to adhere said barrier layer to at least one of the other layers.

4. A process of making multi-layer plastic containers which comprises coextruding in the molten state a plurality of plastic layers through a plurality of dies to form a tubular parison, having a plurality of layers, internally blow-molding said parison to form a container, said container having a plurality of layers formed from said parison comprising an inner thermoplastic polyolefin layer which is next to the product; and outer polyolefin thermoplastic layer; a barrier layer to prevent product oxidation or product permeation loss; a scrap layer including a mixture of a regrind of all the layers from previous containers of the same construction, said previous containers comprising inner and outer thermoplastic polyolefin layers, a barrier layer, an adhesive layer and a scrap layer; and at least one adhesive layer to adhere said barrier layer to at least one of the other layers.

5. A process as in claim 2 or 4 wherein said adhesive is comprised of maleic anhydride-modified polyprophylene.

6. A process as in claim 2 or 4 wherein a second adhesive layer adheres said scrap layer to said inner thermoplastic layer.

7. A multi-layer parison blow-molded plastic container comprising a container-shaped structure having a multi-layer translucent laminate wall with an outer thermoplastic polyolefin layer; an inner thermoplastic polyolefin layer and an intermediate barrier layer; a first adhesive layer for adhesively joining said inner thermoplastic polyolefin layer to said barrier layer; a scrap layer interiorly of said outer thermoplastic polyolefin layer and a second adhesive layer for adhesively joining said scrap layer to said barrier layer, wherein said scrap layer includes a mixture of a regrind of all the layers from previous containers of the same construction, said previous containers comprising inner and outer thermoplastic polyolefin layers, a barrier layer, adhesive layers and a scrap layer.

8. A container as in claim 1, 3 or 7 wherein said adhesive is comprised of maleic anhydride-modified polypropylene.

9. A container as in claim 7 wherein said inner and outer thermoplastic layers are made of polypropylene or random copolymer of propylene and ethylene containing up to about 2 mol percent ethylene.

10. A container as in claim 8 wherein said inner and outer thermoplastic layers are made of polypropylene or random copolymer of propylene and ethylene containing up to about 2 mol percent ethylene.

11. A container as in claim 1, 3, or 7, wherein a second adhesive layer adheres said scrap layer to said inner thermoplastic layer.

12. A multi-layer plastic container adapted to contain oxygen sensitive products or contain products sensitive to permeation losses, and formed by coextruding in a molten state a plurality of plastic layers to form a parison, forming said parison into a container by blow-molding, said container having layers formed from said parison comprising a thermoplastic polyolefin layer; a layer functioning as a barrier layer to prevent product oxidation or product permeation loss; and a scrap layer, said scrap layer comprising a mixture of a regrind of all layers from previous containers of the same construction but said scrap layer not including the combination of scrap and an adhesive layer or bonding layer, said previous containers comprising a thermoplastic polyolefin layer, a layer functioning as a barrier layer, and a scrap layer.

13. A container as in claim 1, 3 or 12 wherein the container is formed from said parison so as to be translucent.

14. A multi-layer plastic container as in claim 1, 3, 7 or 12 wherein said parison is blow molded into a translucent container having a neck portion and a body portion and wherein said nect portion has a smaller cross-sectional area than the cross-sectional area of the body portion.

15. A container as in claim 12 further including an adhesive layer.

16. A container as in claim 12 wherein said thermoplastic polyolefin layer is made of polypropylene or random copolymer of propylene and ethylene containing up to about 2 mol percent ethylene.

17. A container as in claim 15 wherein said adhesive layer is comprised of maleic anhydride-modified polypropylene.

18. A process of making multi-layer plastic containers which comprises coextruding in the molten state a plurality of plastic layers to form a parison, forming said parison into a container by blow-molding, said container having a plurality of layers formed from said parison comprising thermoplastic polyolefin layer; a layer functioning as a barrier layer to prevent product oxidation or product permeation loss; and a scrap layer, said scrap layer comprising a mixture of a regrind of all the layers from previous parison blow-molded containers of the same construction but said scrap layer not including the combination of scrap and an adhesive layer or bonding layer, said previous containers comprising a thermoplastic polyolefin layer, a layer functioning as a barrier layer, and a scrap layer.

19. A process as in claim 2, 4 or 18 wherein the said parison is formed into a translucent container.

20. A process as in claim 2, 4 or 18 wherein said parison is blow molded into a translucent container having a neck portion and a body portion and wherein said neck portion has a smaller cross-sectional area than the cross-sectional area of the body portion.

21. A process as in claim 18 wherein said thermoplastic polyolefin layer is made of polypropylene or random copolymer of propylene and ethylene containing up to about 2 mol percent ethylene.

22. A process as in claim 18 wherein one of said layers is an adhesive comprised of maleic anhydride-modified polypropylene.

23. A process as in claim 22 wherein said adhesive layer adheres said scrap layer to said thermoplastic layer.

* * * * *